United States Patent [19]

Cook

[11] Patent Number: 4,500,008
[45] Date of Patent: Feb. 19, 1985

[54] WEATHERPROOF AND/OR DUST PROOF FITTING

[75] Inventor: David L. Cook, Christchurch, New Zealand

[73] Assignee: PDL Industries Limited, Christchurch, New Zealand

[21] Appl. No.: 421,160

[22] Filed: Sep. 22, 1982

[51] Int. Cl.³ .............................................. H02G 3/14
[52] U.S. Cl. .................................... 220/242; 220/342
[58] Field of Search ....................... 220/326, 241–243, 220/342, 3.8; 277/1

[56] References Cited

U.S. PATENT DOCUMENTS 3,843,013  10/1974  Brooks ............................... 220/326
4,381,063   4/1983  Leong ................................ 220/242

Primary Examiner—Robert I. Smith
Attorney, Agent, or Firm—Holman & Stern

[57] ABSTRACT

A weatherproof and/or dust proof fitting including a cover attached to a housing and adapted to pivot from an open position to a closed position where a sealing means in the cover or housing seals an opening in the housing, the arrangement being such that the cover is biased to its closed position so that a latching means formed in association with the cover or the housing automatically closes to lock the cover over the opening in the housing.

16 Claims, 3 Drawing Figures

WEATHERPROOF AND/OR DUST PROOF FITTING

BACKGROUND OF THE INVENTION

1. Field of the Invention

This invention relates to a weatherproof and/or dust proof fitting and more particularly relates to a weatherproof and/or dust proof fitting which closes substantially automatically and which is usable, for example, in the electrical or related industries.

2. Description of the Prior Art

At present in a situation where a weatherproof fitting is required, for example in the electrical industry, a number of types of fitting are available. These types of fitting generally use two parts which necessitate two separate operations to seal one part of the fitting after it has been used.

An example of this equipment is in the electrical industry generally known as an industrial plug and socket fitting.

One example of weatherproof fitting currently available which meets recognized international standards is an electrical industrial plug and socket. This connection fitting has a socket ring nut which holds a plug in contact and association with an electrical socket. When the plug is withdrawn and the socket is to be sealed a blank screw cap with a finger tightening bar attached thereto is used. The two step sealing operation is the initial removal of the plug and the subsequent placement of the cap in position after which the tightening bar is tightened down to achieve a water and/or dust proof seal over the electrical socket.

Another type of weatherproof fitting currently available is a bayonet and ramp type fitting which requires a locking ring to be rotated to clamp a plug to a socket. When the plug is removed from this type of fitting a flap over the exposed socket is closed with a bar which engages with the bayonet slots. The bar has to be rotated to lock and seal the cover. Again at least a two step operation is required to remove the plug and seal the exposed socket.

Both of the abovementioned types of weatherproof fitting have been used interiorally and exteriorally and suffer from the disadvantage that at least one extra step is required after the plug is withdrawn in order to seal the socket.

An object of the present invention is therefore to provide a weatherproof and/or dust proof fitting which overcomes, at least in part, the disadvantage mentioned above which are inherent in existing similar types of fitting.

A further object of the present invention is to provide a weatherproof and/or dust proof fitting which offers to the public a useful alternative choice.

Further objects and advantages of the present invention will become apparent from the following description which is given by way of example only.

SUMMARY OF THE INVENTION

According to a first aspect of the present invention there is provided a method of sealing a fitting against the ingress of dust and water thereto, the method including:

fitting a cover in association with a housing;
 biasing the cover to a closed position;
 positioning in the cover or housing a sealing means;
 positioning a latching means in association with the housing or cover so that the closure when in an open position moves substantially automatically under the action of the bias to close the latching means to thereby firmly seal the cover in association with the housing.

According to a second aspect of the present invention there is provided a weatherproof and/or dust proof fitting including a cover attached to a housing and adapted to pivot from an open position to a closed position where a sealing means in the cover or housing seals an opening in the housing, the arrangement being such that the cover is biased to its closed position so that a latching means formed in association with the cover or the housing automatically closes to seal the cover over the opening in the housing.

The parts of the fitting, including the housing, cover and latching means can be injection moulded from plastics materials.

The housing can have in a front face thereof a recess associated with which is a bore in which an electrical socket means is positioned so that an electrical plug can engage therewith when the cover is in its open position.

The cover can have adjacent one edge thereof a hinge means and on the opposite edge thereof the latching means. The hinge means is mounted in association with a hinge pin mounted on the face of the housing and has associated therewith the biasing means.

The cover can have a peripheral recess formed on the inner surface thereof so that a synthetic or natural rubber or plastics sealing ring can be inserted therein to constitute the sealing means. The recess is positioned so that when the cover is in its closed position the sealing ring is compressed against a skirt region formed in the front face of the housing.

The skirt region can be formed as a wall of the recess in the front face and can have formed integrally therewith or in association therewith a screw thread or bayonet slots to which the plug is engaged to hold the plug in contact with the socket within the bore.

The latching means can be associated with the cover or the housing and has a latch part on the cover or housing which engages when the cover is sealed against the housing with a catch or ledge in the housing or cover respectively. The latch part is engaged in a slot formed in the cover or housing, the slot forms a mounting for the latch part and the mounting has therein a resilient biasing means which biases an engaging portion of the latch part toward its locking position.

Further aspects of the present invention which should be considered in all its novel aspects will become apparent from the following description which is given by way of example only.

BRIEF DESCRIPTION OF THE DRAWINGS

An example of the present invention will now be described with reference to the accompanying drawings wherein.

DESCRIPTION OF THE PREFERRED EMBODIMENTS

Figure 1:
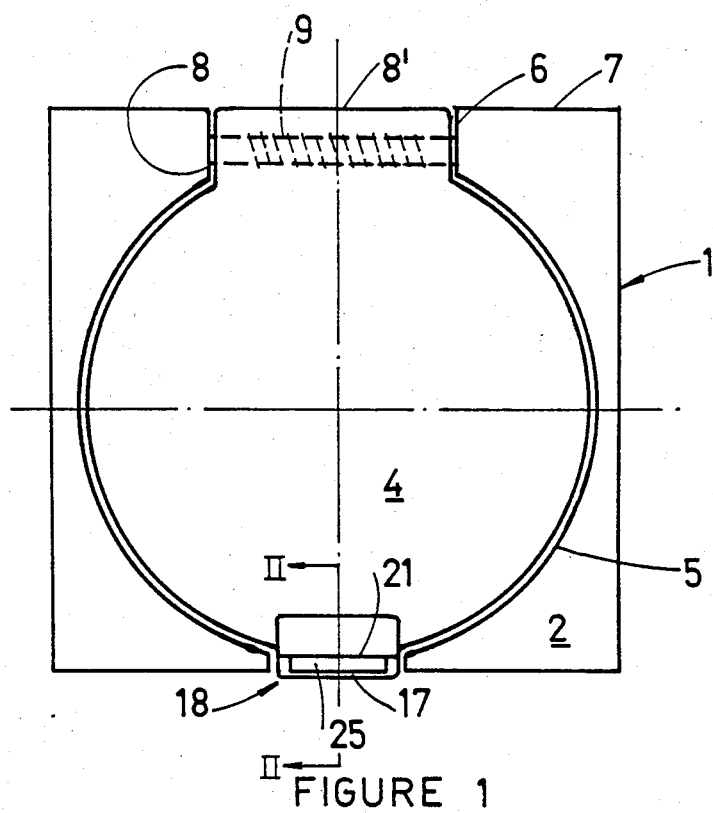
FIG. 1 is a front elevational view of a weatherproof and/or dust proof fitting according to the present invention.

The example of fitting shown has a generally square housing indicated by arrow 1 and has in a front face 2 thereof a generally circular opening 3 which is closed and sealed by a cover 4. The housing 1 has in the front face 2 thereof a circular recess 5 which is of the same general dimensions as that of the cover 4. The recess 5 has an extension 6, adjacent to an upper edge 7 of the housing 1 and across which a hinge pin 8 extends. The hinge pin 8 supports a hinge means 8' formed integrally with the cover 4. The hinge pin 8, hinge means 8' and region of the recess 5 in the housing therebehind have in association therewith a biasing means 9. The biasing means 9 is adapted to bias the cover to a closed position thereof shown in FIGS. 1 and 2.

The cover 4 has on an inner surface 10 thereof a circular peripheral recess 11 in which a compressible synthetic or natural rubber or plastics sealing ring 12 is fitted.

The opening 3 in the housing 1 has a bore 13 associated therewith in which can be sited an electrical socket (not shown). The bore 13 and the recess 5 have an extension 14 formed therebetween which constitutes a skirt 15 on an outer periphery of which is a screw threaded region 16. In use with the cover 4 open the screw threaded region 16 of the skirt 15 has engaged thereon a surround formed on an electrical plug (not shown).

Figure 2:
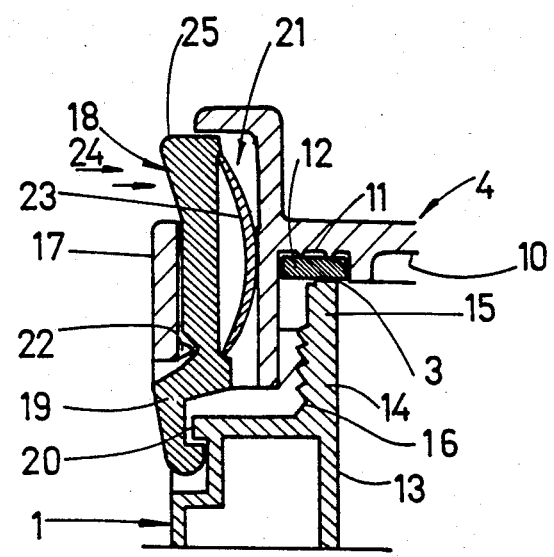
FIG. 2 is a vertical cross-sectional view taken on the line II—II through part of the fitting shown in FIG. 1.
Figure 3:
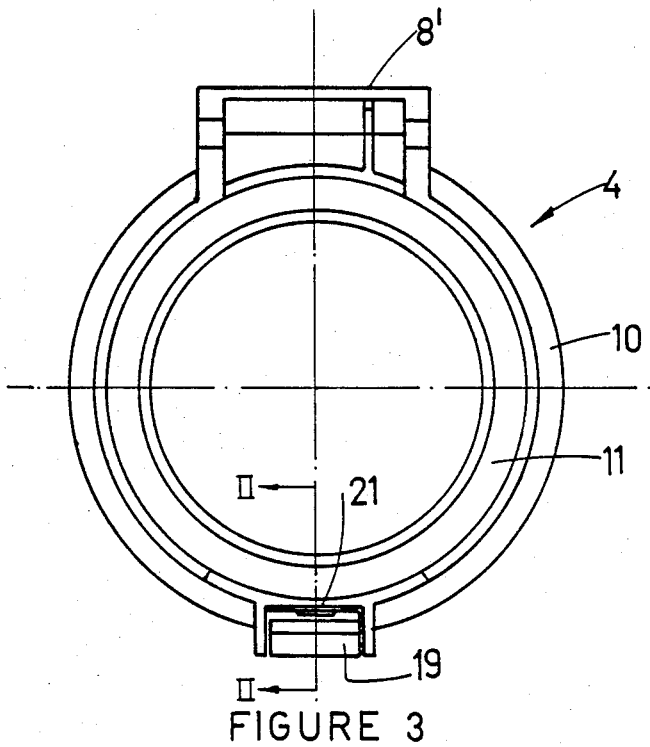
FIG. 3 is a view from within the fitting of the cover for the fitting shown in FIGS. 1 and 2.

The cover 4 has on a bottom edge 17 thereof a latching means generally indicated by arrow 18. The latching means 18 has a shaped latch part 19 which engages on an appropriately positioned ledge 20 formed in the lower edge of the housing 1 when the cover 4 is in its closed position (FIG. 2).

The latch part 19 is positioned in a slot 21 formed in the lower edge of the cover 4. The slot 21 has a V-shaped projection or projections 22 so that when the latch part 19 is inserted in the slot 21 it cannot be accidently removed. The latch part 19 is biased by a resilient biasing means 23 toward its locked position (FIG. 2).

The resilient biasing means 23 can be an arc or leaf spring shaped strip of a resilient plastics material which biases the latch part 19 to its closed position and which allows the latch part 19 to be released. This release is caused by pivoting the latch part 19 about the projections 22 when pressure is applied in the direction of arrows 24 to a projection 25 formed at the opposite end of the latch part 19 to the engaging portion of the latch. The latching means 18 when released allows the cover 4 to be pivoted to an open position (not shown).

In use the fitting can be used wherever a dust and/or weatherproof seal is required. An electrical plug (not shown) can be engaged with an electrical socket (not shown) positioned in a bore within the housing. In this condition a surround (not shown) associated with the plug locates the plug in position by engagement with the screw thread 16 on the skirt 15. In this position the cover 4 is held open and rests on the top of the plug.

On removal of the plug the biasing means 9 automatically causes the cover 4 to drop. The motion thereof under the bias 9, provided the cover 4 has been opened with an angular displacement greater than about 45° causes the latching part 19 when it contacts the ledge 20 to pivot and move against the resilient biasing means 23 to allow the cover 4 to fully close. When in its closed position the sealing ring 12 seals against the skirt 15 to prevent the ingress of water and/or dust.

The substantially automatic closing of the cover 4 ensures that as soon as a plug is removed or the cover 4 is open with a greater angular displacement than 45° the cover 4 automatically closes and seals the fitting.

The provision of the removable latch part 19 allows for replacement or repair to be easily effected and allows the fitting to be simply and easily assembled after manufacture of the components parts.

It is to be appreciated that the parts of the fitting can be injection moulded from a range of plastics materials selected to suit their purpose. For example, the housing, cover and latch part can be manufactured from a polycarbonate material treated against deterioration under the action of ultra violet light. The resilient biasing means 23 can be formed from an appropriately resilient plastics material.

It is to be appreciated that as an alternative to the construction described the latching means can be formed in association with the housing 1 and the ledge part formed on the cover if desired.

It is also envisaged that the invention can be used with other than industrial plug and socket fittings, for example as a means of sealing pendent fittings or as a cover for thermostats, switches, relays, Lamson (Regd. Trademark) tubes or other connections in the electrical or other trades.

Thus by this invention there is provided a weatherproof and/or dust proof fitting usable, for example, in the electrical industry.

A particular example of the invention has been described herein by way of example and it is envisaged that improvements and modifications can take place without departing from the scope and spirit of the appended claims.

I claim:

1. A weatherproof and dust proof fitting cover comprising: a housing having a base attachable to a wall and similar surface; a bore in said base adapted to receive a fitting therein; a recess in said base surrounding said bore; a cover pivotally attached to the base for movement between an open and closed position and having a peripheral configuration substantially the same as said recess so that when in closed position it covers the bore; a resilient sealing means operatively disposed between said cover and recess to seal the bore when said cover is in the closed position; means to bias said cover toward its closed position wherein the inner surface of said cover and said sealing means contact each other; and latching means which automatically closes to releasably lock the cover in its closed position comprising a ledge protruding from the housing, a slot formed in the cover, a latching member mounted for toggle-like movement in said slot, a lip on said latching member cooperatively engageable with said ledge to lock said cover in said closed position, and a resilient biasing means operatively mounted in said slot to bias said latching member toward its locking position wherein said lip is engaged with the ledge of the housing and is disengageable from said ledge by pressing a part of said latching member against the force of said latch biasing means.

2. A fitting cover as claimed in claim 1 wherein said sealing means is incorporated in said cover.

3. A fitting cover as claimed in claim 2 wherein said cover has a lower edge and an upper edge, said latching means is disposed adjacent said lower edge, said cover is pivotally attached to the base by a hinge pin mounted adjacent the upper edge of the cover, and said cover biasing means is operatively associated with said hinge pin.

4. A fitting cover as claimed in claim 3 wherein said cover has a peripheral recess formed on the inner surface thereof and said sealing means comprises a plastic sealing ring in said peripheral recess.

5. A fitting cover as claimed in claim 3 wherein said cover has a peripheral recess formed on the inner surface thereof and said sealing means comprises a rubber sealing ring inserted in said peripheral recess.

6. A fitting cover as claimed in claim 5 wherein said housing has an outwardly directed skirt region formed on the part thereof against which said cover engages, and said peripheral recess is positioned so that when the cover is in its closed position the sealing ring is compressed against said skirt region.

7. A fitting cover as claimed in claim 6 wherein said skirt region is formed as a wall of the recess in said base and has formed integrally therewith a screw thread with which the fitting is engageable to hold the fitting in said bore.

8. A fitting cover as claimed in claim 6 wherein said skirt region is formed as a wall of the recess in said base and has formed integrally therewith bayonet slots with which the fitting is engageable to hold the fitting in said bore.

9. A weatherproof and dust proof fitting as claimed in claim 6 wherein said skirt region is formed as a wall of the recess in said base and has formed integrally therewith bayonet slots with which a plug is engageable to hold the plug in contact with a socket within the bore.

10. A weatherproof and dust proof fitting as claimed in claim 6 wherein said skirt region is formed as a wall of the recess in said base and has formed integrally therewith a screw thread with which a plug is engageable to hold the plug in contact with a socket within the bore.

11. A fitting cover as claimed in claim 1 wherein said housing, pivotable cover and latching means are made of injection moulded plastics materials.

12. A fitting cover as claimed in claim 11 wherein said pivotable cover and said base each have a front face and said pivotable cover fits into said recess in the base with said front faces being in the same plane when the cover is closed.

13. A fitting cover as claimed in claim 1 wherein said slot has at least one V-shaped projection on an inner surface thereof which restrains said latching member against accidental dislodgement and which comprises at least one point about which said latching member pivots for latching and unlatching the cover.

14. A fitting cover as claimed in claim 13 wherein said resilient latch biasing means is an arc-shaped strip of a resilient plastics material.

15. A weatherproof and dust proof fitting cover comprising a housing having a base attachable to a wall and similar surface; a bore in said base adapted to receive a fitting; a recess in said base surrounding said bore; a cover pivotally attached to the base for movement between an open and closed position and having a peripheral configuration substantially the same as said recess so that it covers the bore when in the closed position; a resilient sealing means operatively disposed between said cover and recess to seal said bore when said cover is in the closed position; means to bias said cover toward its closed position wherein the inner surface of said cover and sealing means contact each other; and latching means which automatically closes to lock the cover in its closed position comprising, a ledge protruding from the cover, a slot formed in the base, a latching member mounted for toggle-like movement in the slot, a lip on said latching member cooperatively engageable with said ledge to lock said cover in the closed position, and a resilient biasing means operatively mounted in said slot to bias said latching member toward its locking position wherein said lip is engaged with the ledge of the cover and is disengageable from said ledge by pressing a part of said latching member against the force of said latch biasing means.

16. A fitting cover as claimed in claim 21 wherein said sealing means is incorporated in said housing.

* * * * *